US007493601B2

(12) United States Patent
Gimness et al.

(10) Patent No.: US 7,493,601 B2
(45) Date of Patent: Feb. 17, 2009

(54) SYSTEM AND METHOD FOR PROVIDING ACCESS TO PROGRAMMER CREATED JAVA CLASSES

(75) Inventors: Joseph A. Gimness, Tucson, AZ (US); Jason L. Peipelman, Tucson, AZ (US); Paul A. Jennas, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 10/993,743

(22) Filed: Nov. 19, 2004

(65) Prior Publication Data

US 2006/0117296 A1 Jun. 1, 2006

(51) Int. Cl.
*G06F 9/44* (2006.01)
*G06F 9/45* (2006.01)

(52) U.S. Cl. .................. 717/131; 717/128; 717/139; 717/148; 717/153

(58) Field of Classification Search .................. None
See application file for complete search history.

(56) References Cited

U.S. PATENT DOCUMENTS

| 6,526,571 | B1 | 2/2003 | Aizikowitz et al. | |
|---|---|---|---|---|
| 6,708,276 | B1 | 3/2004 | Yarsa et al. | |
| 7,080,077 | B2* | 7/2006 | Ramamurthy et al. | 707/9 |
| 2004/0019809 | A1 | 1/2004 | Sheinis et al. | |
| 2004/0040017 | A1* | 2/2004 | Kershenbaum et al. | 717/158 |

* cited by examiner

*Primary Examiner*—Chuck O Kendall
(74) *Attorney, Agent, or Firm*—Scully, Scott, Murphy & Presser, P.C.

(57) ABSTRACT

A system and method implementable in a JAVA® application for providing C++ language friend-style access that grants JAVA® objects access to methods of another JAVA® object. The method comprises steps of: providing a method in the implementing JAVA object for determining the name of a JAVA object class that has called a method within the implementing JAVA object; comparing the JAVA object class name against a list of object names that have been granted access rights to the method in the implementing JAVA object; and, in response to the comparing, one of: enabling execution of the method of the implementing JAVA object upon determination that the calling object class is a member of the list, or, preventing execution of the method upon determination that the calling object is not a member of the list.

10 Claims, No Drawings

SYSTEM AND METHOD FOR PROVIDING ACCESS TO PROGRAMMER CREATED JAVA CLASSES

BACKGROUND OF THE INVENTION

1. Field of the Invention

The present invention relates to the JAVA® programming language and particularly, a system and method of implementing a friendly class structure that enables a programmer to grant specific packages and classes access to a class that he or she creates without granting unnecessary access to other classes.

2. Description of the Prior Art

In the C++ language, there exists three levels of internal protection for the different members of a class: public, protected and private. For the case of members protected and private, these could not be accessed from outside the same class at which they are declared. Nevertheless, this rule is transgressed by making use of the C++ "friend" keyword in a class which permits an external function to gain access to the protected and private members of a class. Thus, in C++ language, in order to allow an external function to have access to the protected and private members of a class, there must be declared the prototye of the external function that will gain access preceded by the keyword "friend" within the class declaration that shares its members.

The JAVA® programming language (JAVA is a registered trademark of Sun Microsystems, Inc., located in Mountain View, Calif.) does not utilize a friend-type construct that would allow the programmer to grant specific classes nor packages access to a given class. In JAVA®, the programmer can make classes and methods private, protected, or public. Private access grants access to other methods within the same class and any subclasses. Protected access grants the same access as private but also grants access to any classes within the same package. Public access grants access to all classes.

With these levels of access in JAVA®, in order to allow another class to have access to a specific method, the programmer is forced to either grant access to every class within the package (using protected access), if that class is in the same package as the class that is being created by the programmer, or grant access to every Java class that is built with his or her class (using public access). Therefore, there may be classes that have access to the class created by the programmer to which he or she does not want to grant access.

It would be highly desirable to provide capability in the Java programming language to enable a programmer to grant specific packages and classes access to a class that he or she creates and particularly to allow specific classes to access his or her class without granting unnecessary access to other classes.

SUMMARY OF THE INVENTION

The present invention is directed to a system, method and JAVA® language programming construct that enables the programmer to grant specific packages and classes access to a class that the programmer has created. The advantage to using this invention as opposed to simply using public or protected access is that the programmer can allow specific classes to access his or her class without granting unnecessary access to other classes.

Thus, according to the invention, there is provided a system and method implementable in a JAVA® application for providing C++ language friend-style access that grants JAVA® objects access to methods of another JAVA® object. The method comprises steps of: providing a method in the implementing JAVA object for determining the name of a JAVA object class that has called a method within the implementing JAVA object; comparing the JAVA object class name against a list of object names that have been granted access rights to the method in the implementing JAVA object; and, in response to the comparing, one of: enabling execution of the method of the implementing JAVA object upon determination that the calling object class is a member of the list, or, preventing execution of the method upon determination that the calling object is not a member of the list.

DETAILED DESCRIPTION OF THE PREFERRED EMBODIMENTS

In order to implement this invention, a JAVA® language class would maintain an array of Strings specified by the developer where each element would represent either a package or class name that has access to the implementing class' public methods.

The implementing class additionally includes an "access-checking" method that would check to see whether or not a calling class has access to its public methods. To do this, the method creates a new Exception object and checks the stack trace of that Exception (i.e., Exception.getStackTrace( )) to determine the name of the class that has called a method within the implementing class. It would then search for the class name of the calling class among the array of class names that have access to the implementing class. If the class name is found in the array then the calling class has access, otherwise it does not have access.

This access-checking method is called at the beginning of each public method. If it indicates that the calling class has access then execution within the public method would proceed as usual, otherwise the public method would either return immediately in a failed state or throw an exception.

A pseudo code description of a CLASS "Friend"—which is a utility class that is used by all the other classes that are going to check for the "friend" style—is now provided. This class particularly checks an input list (Friends) to see if a calling class has access.

```
public class Friend
{
    /**
     * @param friends
     * @return
     */
    public static boolean hasAccess(List friends)
    {
        return friends.contains((new
Exception( )).getStackTrace( )[2].getClassName( ));
    }
}
```

From the foregoing class Friend pseudo code, the Boolean "has Access" method returns a "true" if the current user has the specified access to the class (resource). The "getStackTrace" method from the Java Throwable class, returns, when an Exception is made, the calling stack trace providing who called the method from a traceback (i.e., the name of the CLASS). In the pseudocode depicted, the third element in the stack trace, getStackTrace( )[2], is actually being dereferenced because the first element, getStackTrace[0], will be the current method, hasAccess( ), and the second element, getStackTrace[1], will be the method that would like to check if it is being legally accessed. So the third element, getStack- Trace[2], is the method that needs to be checked to see if it has access and this is the only element in the stack trace that needs to be checked. It is understood that this is configurable for an example implementation whereby a friend (e.g., class A) calls a method of another class (e.g., method X) that has called a method (e.g., method Y) then, method X would be allowed to call method Y, where A is a friend of Y but X is not. This "has Access" method will thus determine if the calling CLASS is a friend.

It is understood that any class wishing to use the hasAccess method functionality would only need to import the Friend class to use its hasAccess( ) method. According to the invention, there is provided two ways in which to provide Friend access: 1) based on methods ("methodFriends"); and, 2) based on Classes ("classFriends"). A pseudo code description of an example class "MyClass" utilizing the c++-style Friend access is now provided as follows:

exact implementation (only the abstracted data type), the present invention may be implemented. For instance, programmer "A" wants to use the abstracted data type, and needs a specific implementation of this data type (implementation 1). Using the factory programming paradigm of the invention, the user is permitted access to an anonymous factory, that will in turn instantiate the specific implementation requested (and it will be allowed to because the factory is a friend of the implementation). In this case, the user will still see the abstracted data type, but the underlying implementation will remain hidden from the user.

It is understood that another class who is a friend must be a "classFriend" to initially make the MyClass object using the constructor. After the object is made, it may be passed around to other objects however, only methodFriends can use that object. classFriends can construct the object and use the methods within it.

```
public class MyClass
{
    private static final List methodFriends = new ArrayList( );
    private static final List classFriends = new ArrayList( );
    static
    {
        //the following fills the list arrays with class and method friends to which access
        //to MyClass will be granted
        //
        //add the class name of each friend to the class here
        classFriends.add("package.AnotherClass");
        //add the class name of each friend to the list
        methodFriends.addAll(classFriends);
        methodFriends.add("package.Class");
    }
    public void friendlyMethod( )
    {
        //the following example method uses utility class "Friend" to determine if the
        // calling method is a member of the "methodFriends" list and has access to this method
        if (!Friend.hasAccess(methodFriends))
        {
            return;
        // or throw an exception or error code
        }
        // rest of code for method starts here if it is determined that the calling method has access
    }
    public MyClass( ) throws AccessDeniedException// a Java constructor
    {
        //the following example method uses utility class "Friend" to determine if the
        // calling method is a member of the "classFriends" list and has access to all of
        // MyClass's methods
        if (!Friend.hasAccess(classFriends))
        {
            throw new AccessDeniedException( ); // or return error code
        }
    }
}
```

The novel functionality lies in the Friend class in the example provided. This class checks for access by using the stack trace generated by the Exception class. It is understood that the "access-checking" method that checks to see whether or not a calling class has access to its public methods and the "Friend" class that checks for access by using the stack trace generated by the Exception class as applicable to applications written in Java, however, any design paradigm can make use of the functionality described. Additionally, as a result of the novel method being Java-based, it can be used on any hardware platform.

Thus, accordingly, for any instance an application includes an abstracted data type that has multiple implementations, and a user does not want the user (programmer, etc.) to see the The embodiment of the invention described herein, may be implemented in an application (e.g., stand-alone, or client/server-based or distributed object-based) or an applet written in the platform-independent programming language of JAVA®. However, the invention is not limited to JAVA® application code only. For example, the present invention can be applied to any platform-independent software application having application code that is "platform neutral" (e.g. that it can be distributed and run across different technical platforms). An example of platform neutral application-code is "bytecode" in the Java programming language. Alternative embodiments may utilize other platform-independent programming languages, and/or platform-independent techniques (such as virtual machines) not related to the programming language of Java or similar languages such as C++.

One common example of a virtual machine is the "Java virtual machine" ("JVM") that is typically used in conjunction with software applications and applets written in Java. However, the Java virtual machine can be configured or extended to operate for other programming languages rendering those languages potentially "platform independent." Similarly, other virtual machines designed with a particular application language in mind can be configured to allow utilization by application code components of a different type.

It is further understood that the present invention could be used in any application, whether distributed, client/server, or just on one machine. In a preferred implementation, the system and method of implementing these JAVA® language constructs is used in a client/server model, where most methods called on the client are translated into network calls, for example, to be executed on the server. It is understood however, that some methods may be executed locally on the client.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A computer implemented method for granting one or more first object-oriented programming language classes access to a method of an implementing class that is created without granting unnecessary access to other methods within that implementing class, said method comprising the steps of:
    providing an array comprising a list of names of first classes that have been granted access rights to said method in said implementing class;
    providing a method in said implementing class for determining the name of a first class that has called a method within the implementing class, said method creating an exception object prior to accessing said method within the implementing class to perform a stack traceback to determine the name of the class that has called a method within the implementing first class;
    comparing said class name against said list of first classes that have been granted access rights to said method in said implementing class; and, one of:
    executing code of said method of the implementing class upon determination that said calling class is a member of said list, or, preventing execution of said code in said method upon determination that said calling class is not a member of the list.

2. The computer implemented method of claim 1, further comprising the steps of:
    determining the name of a method in one or more first classes that have called a method within the implementing class;
    comparing said method name against a list of method names that have been granted access rights to said method in said implementing class; and, one of:
    executing said method of the implementing class upon determination that said calling method is a member of said list, or, preventing execution of said method upon determination that said calling method is not a member of the list.

3. The computer implemented method of claim 2, further comprising the step of filling an array comprising a list of names of methods of first classes that have been granted access rights to said method in said implementing class.

4. An access system implementable in an object-oriented programming application executing on a computing device for granting objects access to methods of another object comprising:
    computer implemented code means executable by a computing device for providing an array comprising a list of names of friend classes that have been granted access rights to said method in said implementing object;
    computer implemented code means executable by a computing device for executing a method in an implementing object for determining the name of an object class that has called a method within the implementing object, said computer implemented code means creating an exception object prior to accessing said method within the implementing object to perform a stack traceback to determine the name of calling object class;
    computer implemented code means executable by a computing device for comparing said object class name against said list of friend class objects that have been granted access rights to said method in said implementing object; and,
    computer implemented code means executable by a computing device responsive to said comparing means for enabling execution of said method of the implementing object upon determination that said calling object class is a member of said list, or, preventing execution of said method upon determination that said calling object class is not a member of the list.

5. The access system implementable in an object-oriented programming application as claimed in claim 4, wherein said utility friend class further comprises means for determining the name of a method in a calling object that has called a method within the implementing class, said comparing means further comparing said method name against a list of method names that have been granted access rights to said method in said implementing object; and, one of: executing said method of the implementing object upon determination that said calling method is a member of said list, or, preventing execution of said method upon determination that said calling method is not a member of the list.

6. The access system implementable in an object-oriented programming application as claimed in claim 5, further comprising means for filling an array comprising a list of names of methods included in objects that have been granted access rights to said method in said implementing object.

7. A method implementable in an object-oriented programming application for providing C++ language friend-style access that grants objects access to methods of another object comprising:
    providing an array comprising a list of object names associated with classes that have been granted access rights to said method in said implementing object;
    providing a method in said implementing object for determining the name of an object class that has called a method within the implementing object, said method creating an exception object prior to accessing said method within the implementing object to perform a stack traceback to determine the name of the class that has called a method within the implementing object;
    comparing said object class name against said list of object names that have been granted access rights to said method in said implementing object; and, in response to said comparing, one of:
    enabling execution of said method of the implementing object upon determination that said calling object class is a member of said list or, preventing execution of said method upon determination that said calling object is not a member of the list.

8. The method as claimed in claim 7, further comprising the steps of:

determining the name of a method in an object that has called a method within the implementing object;

comparing said method name against a list of method names that have been granted access rights to said method in said implementing object; and, one of:

executing said method of the implementing class upon determination that said calling method is a member of said list, or, preventing execution of said method upon determination that said calling method is not a member of the list.

9. The method as claimed in claim 8, further comprising means for filling an array comprising a list of methods included in objects that have been granted access rights to said method in said implementing object.

10. A program storage device readable by a machine, tangibly embodying a program of instructions executable by the machine to perform method steps for granting object-oriented programming objects access to methods of another object, said method steps comprising:

providing an array comprising a list of objects that have been granted access rights to said method in said implementing object;

providing a method in said implementing object for determining the name of a object class that has called a method within the implementing object, said method creating an exception object prior to accessing said method within the implementing object to perform a stack traceback to determine the name of the object class that has called a method within the implementing object;

comparing said object class name against said list of objects that have been granted access rights to said method in said implementing object; and, in response to said comparing, one of:

enabling execution of said method of the implementing object upon determination that said calling object is not a member of said list or, preventing execution of said method upon determination that said calling object is not a member of the list.

\* \* \* \* \*